Oct. 31, 1933.   F. H. LE JEUNE   1,933,178
WIRE WHEEL
Filed Dec. 23, 1929
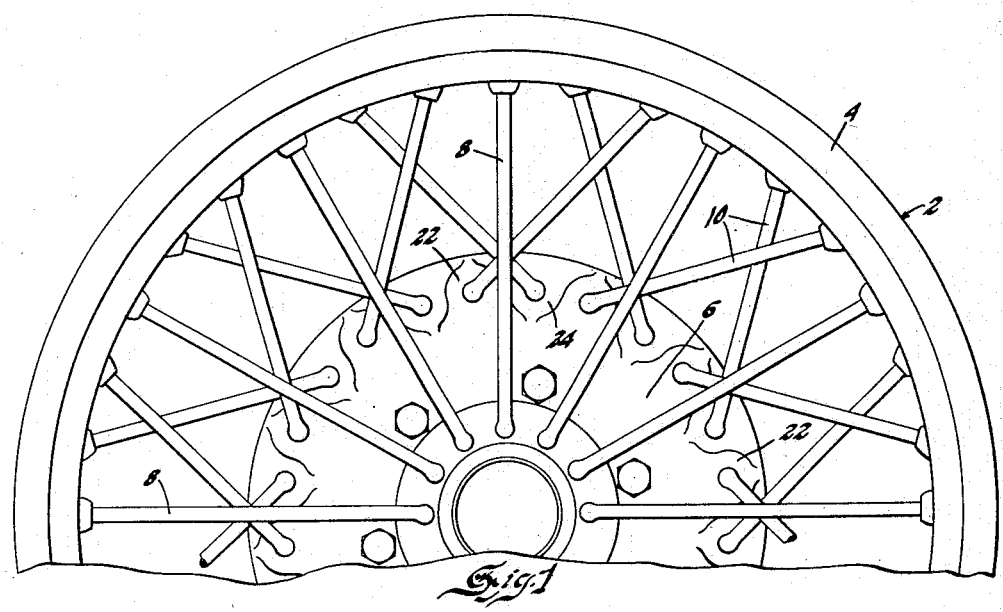
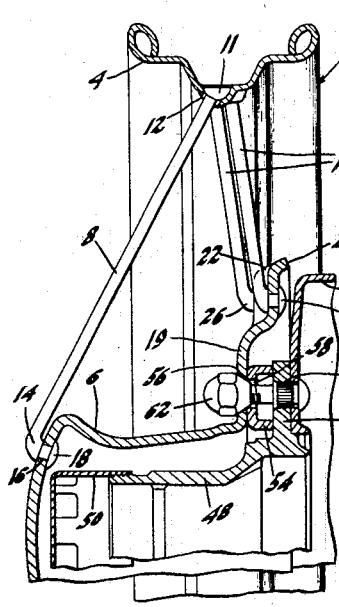
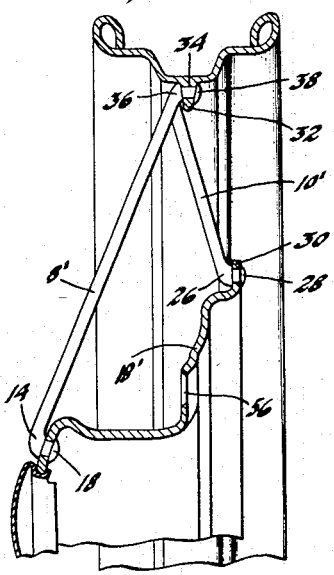
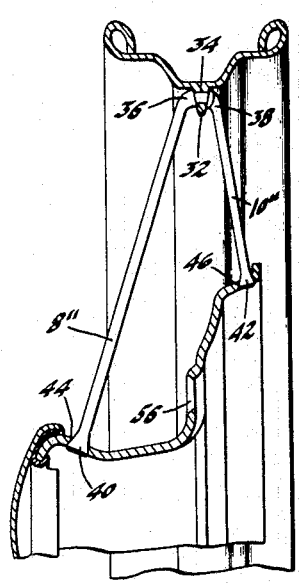
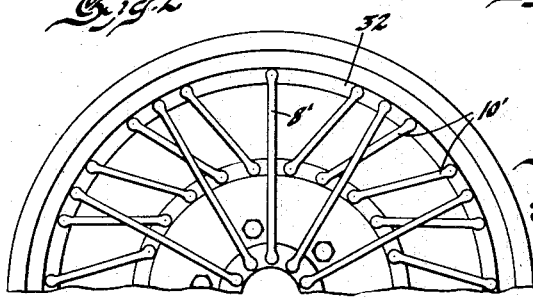
Inventor
Frank H. Le Jeune
By Blackmore, Spencer & Flint
Attorneys Patented Oct. 31, 1933

1,933,178

UNITED STATES PATENT OFFICE 1,933,178

WIRE WHEEL

Frank H. Le Jeune, Jackson, Mich., assignor, by mesne assignments, to Kelsey-Hayes Wheel Corporation, a corporation of New York Application December 23, 1929
Serial No. 416,055

4 Claims. (Cl. 301—55)

This invention relates to improvements in wheels and has particular reference to metallic wire spoke wheels.

The principal object of the invention is to enable a ready application of the wire spokes to the rim and hub and to secure the spokes so that all spokes of one group may be riveted at one time, thus increasing the speed and decreasing the cost of manufacture.

In the preferred form of the invention the hub is provided with the usual flange on its inner side and two rows of spokes connect the hub and the rim. The row connecting the hub flange with the rim is much shorter than the outer row of spokes and has its adjacent spokes crossing each other or running in substantially opposite directions. The hub flange is provided with a plurality of bosses or projections in each of which a spoke opening is formed for the reception of one end of the shorter spokes. One spoke end is attached to each boss and in each recess therebetween while the opposite end of the spoke is secured in staggeredly-arranged openings in the rim. This construction enables the main portion of the spokes to be placed in different parallel planes so that in their final position, each shorter spoke will cross two other shorter spokes which run at an angle thereto.

The outer or longer row of spokes are preferably radially arranged and do not cross each other.

As a modification of the invention, the rim is provided on its inner side with a ring or an annular flange which is provided with a plurality of openings adapted to receive one end of both inner and outer rows of spokes. At the hub portion, the spokes are attached to the inner and outer portions thereof with all of the riveted or turned over ends facing inwardly of the wheel so that the ends will not be visible when the wheel is applied to the vehicle. The spokes are preferably all attached to the rim flange from the inner side so that all of the ends will be on one side to enable the riveting operation to be more readily performed.

As a modification of the invention, the spokes will have enlarged head portions or sections fitting in corresponding openings in the hub. The spoke ends are angularly bent and inserted through the openings and the outer angular ends applied to the ring or flange on the inner portion of the rim.

As another modification of the invention, the shorter spokes or the spokes on the inner side of the wheel may be so arranged that they do not cross each other. The spokes are arranged in four quadrants, the spokes in adjacent quadrants slanting in opposite directions and preferably five spokes are arranged in a quadrant. The distinctive part of this species is that none of the spokes cross each other and the torque strains are taken care of by alternating the angle of the spokes in adjacent quadrants. As in the other species, all of the spoke ends may be riveted to the hub and rim from the inside of the wheel.

On the drawing:

Figure 1 shows a side view of a portion of the preferred embodiment of the wheel.

Figure 2 is a section through the preferred species.

Figures 3 and 4 are views corresponding to Figure 2 of modifications.

Figure 5 is a view corresponding to Figure 1 of a modification.

Referring to the drawing, the numeral 2 indicates the wheel as a whole. The wheel has the rim 4 and the hub 6 joined by a row of outer spokes 8 and the row of inner spokes 10.

Each spoke of the outer row 8 has an enlarged head 11 which fits in an opening 12 in the rim 4. At the hub, the spokes 8 have the angular portion 14 which is adapted to be inserted in openings 16 at the outer portion of the hub. After the angular portions 14 are inserted in the openings 16, a suitable device is applied and the end 18 riveted over from the inside of the wheel. From an examination of Figure 2, it will be apparent that all of the riveted over-ends 18 are enclosed on the inside of the hub 6 and face inwardly so that they all may be riveted over from the inside of the wheel. The spokes 8 are preferably radially arranged as shown in Figure 1.

The spokes 10 of the inner row are also preferably provided with heads 11 which fit in openings 12 in the rim. The openings 12 for the smaller spokes are preferably staggeredly arranged so that the adjacent spokes are positioned in separated parallel planes as shown in Figure 2.

The hub 6 at its inner end is provided with the usual flange 19 and at the peripheral portion 20 of the flange there is provided a series of spaced bosses or projections 22 and between each pair of bosses there is the recess 24. Each boss and each recess is provided with an opening adapted to receive the angular end 26 of the spokes 10. The purpose of the bosses is to position the angular ends 26 of the spokes to correspond to the staggeredly-arranged openings 12 in the rim so that the main portions of the spokes are in parallel planes. The structure is shown in Figure 2. The angular ends 26 are adapted to be received in the openings in the bosses 22 and recesses 24 and after they have been applied the ends 28 are suitably riveted over as shown in Figure 2.

It will be noted that the ends 18 and 28 are all on the inside and the riveting over may therefore be performed from but one side of the wheel. This construction lends itself to a quicker and easier manufacture of the wheel, lessens the cost of production, and improves the wheel's appearance.

As a modification of the invention, the flange 18' of the hub may have the boss 22 omitted therefrom and the flange left flat at its end as indicated at 30 in Figure 3. The angular portions 14 and 26 of the spokes are applied the same as described in connection with the species of Figures 1 and 2. The inner portion of the rim is provided with an integral ring or annular flange 32 provided with a plurality of openings 34 in each of which there is adapted to be received the angular ends 36 of the spokes 8' and 10'. As will be noted in Figure 3 the riveted over-ends 18, 28 and 38 all face inwardly or toward one side of the wheel so that the riveting operation may be performed without reversing the wheel.

As a further modification of the invention, the inner and outer spokes 8" and 10" may be provided with enlarged heads 40 and 42 at their hub ends, which enlarged portions are adapted to fit in suitable openings 44 and 46 formed in the hub. At its upper end, the spokes are provided with the angular portions 36 and 38 the same as described in connection with the species of Figure 3. The rim is also provided with the ring or flange 32 with the openings 34 adapted to receive the angular ends 36 and 38. In the species as shown, the inner spokes 10" are arranged so that their riveted over-ends are on the outside. This species, while making a satisfactory wheel, is less desirable than that shown in Figure 3 for the reason that the spokes must be riveted from the two sides of the wheel.

In the species shown in Figure 5, the outer spokes 8' are the same as the spokes shown in Figure 3. The inner spokes 10' are also the same as that shown in the species of Figure 3 except that they are arranged as shown in Figure 5. The shorter spokes 10' are arranged in quadrants and each quadrant preferably has five spokes 10' all arranged in one direction while the adjacent quadrant has five spokes 10' slanted in the opposite direction so that none of the spokes of the wheel cross each other. The view shows only the upper half but the structure is repeated on the lower half of the wheel. The species of Figure 5 has the ring or annular flange 32 the same as shown and described in the species of Figures 3 and 4. The particular advantage of this construction is that all of the spoke ends may be riveted together from the inside of the wheel; none of the spokes cross each other; and the torque strains are taken care of by alternating the angle of the spokes in adjacent quadrants.

Referring to Figure 2, the usual axle driving hub is shown at 48 and 50 designates the cap therefor. The hub has the attaching flange 52 separated from the hub 6 by means of the adapted or spacer member or ring 54. The hub 6 has the openings 56 while corresponding openings 58 and 60 are formed in the ring 54 and flange 52. Bolts 62 pass through the openings to rigidly secure the parts together. A brake drum 64 is also held onto the wheel by means of the bolts 62.

I claim:

1. In a wheel, a hub, a rim, spokes in a plurality of rows forming the sole means connecting said hub and rim, angularly bent portions on all of said spokes fitting in openings in said hub, and axially inwardly facing riveted-over ends on said portions.

2. In a wheel, a hub, a rim, metallic spokes in a plurality of rows forming the sole means connecting said hub and rim, one row having shorter spokes than the other, angularly bent portions on all of said spokes fitting in openings in said hub, and axially inwardly facing riveted-over ends on said portions.

3. In a wheel, hub and rim members, one of said members being provided with substantially axially extending spoke receiving openings, and spokes in a plurality of rows forming the sole means connecting said members, all of said spokes having portions extending through said openings and provided with riveted over ends all facing in the same direction.

4. In a wheel, hub and rim members provided with substantially axially extending spoke receiving openings, and a plurality of rows of spokes forming the sole means connecting said members and having portions at both ends extending through said openings and provided with riveted over ends all facing in the same direction.

FRANK H. LE JEUNE.